United States Patent [19]

Wood

[11] Patent Number: 4,529,217
[45] Date of Patent: Jul. 16, 1985

[54] BOAT TRAILER WIDE GUIDE SELF CENTERING DEVICE

[76] Inventor: E. Wayne Wood, 2101 Hardy Rd., Grand Prairie, Tex. 75051

[21] Appl. No.: 533,418

[22] Filed: Sep. 19, 1983

[51] Int. Cl.³ .............................................. B60P 1/46
[52] U.S. Cl. .................................. 280/414.1; 414/529
[58] Field of Search ...................... 280/414.1, 47.13 B; 414/529, 531; 114/344

[56] References Cited

U.S. PATENT DOCUMENTS

| | | | |
|---|---|---|---|
| 3,447,815 | 6/1969 | West | 280/144 |
| 3,837,509 | 9/1974 | Gladwich | 214/84 |
| 3,993,324 | 11/1976 | Carrick | 280/414.1 |
| 4,011,958 | 3/1977 | Carrich | 214/84 |
| 4,197,050 | 4/1980 | Larson | 280/414.1 |

Primary Examiner—Joseph F. Peters, Jr.
Assistant Examiner—Donn McGiehan
Attorney, Agent, or Firm—James E. Bradley

[57] ABSTRACT

An apparatus for centering a boat on a boat trailer having a chassis. The apparatus has an outrigger arm, extending upward to contact the side of the boat. The outrigger arm is movable to a position away from the boat. The apparatus also has a contact member for contacting the bottom of the boat, the contact member being movable between an upper position and a lower position. The outrigger arms and the contact member are connected together by means of an elongated bar. The elongated bar is pivotally connected to the chassis of the boat trailer. When the boat trailer is first placed into the water, the outrigger arms are in a position wide apart, and the contact members are in their upward position. The boat is then maneuvered between the outrigger arms to a position over the boat trailer. The hull of the boat contacts the contact members, forcing the contact members downward and pivoting the outrigger arms inwardly. As the outrigger arms are forced inwardly, the arms center the stern of the boat over the rear end of the boat trailer.

5 Claims, 2 Drawing Figures

BOAT TRAILER WIDE GUIDE SELF CENTERING DEVICE

BACKGROUND OF THE INVENTION

1. Field of the Invention

This invention relates in general to boat trailers, and in particular to devices for centering a boat on a boat trailer.

2. Description of the Prior Art

One of the major problems involved in loading a boat onto a boat trailer is getting the boat properly aligned on the trailer. The trailer is first backed down a boat ramp until the rear end of the trailer is under the water. The boat is then floated over the submerged part of the trailer. Usually, the bow of the boat is tied to a winch at the front of the trailer, and the bow of the boat is pulled onto the trailer. Wave action and wind often make it difficult to properly align the boat on the trailer.

One method of insuring that the boat is properly aligned on the trailer involves the use of outrigger arms rididly mounted on the sides of the trailer at the rear. The bow of the boat is guided between the two outrigger arms, and the arms keep the boat aligned with the trailer while the boat is pulled onto the trailer.

The distance between the two arms must be only slightly larger than the beam of the boat. The narrow distance between the arms makes it difficult to guide the bow of the boat between the arms. There are movable outrigger arms proposed in the patented art. However, drawbacks exist to these proposals.

SUMMARY OF INVENTION

The apparatus of the invention also involves the use of a pair of outrigger arms. The outrigger arms, one arm on each side of the boat, extend upward to contact the sides of the boat. The arms are connected to the chassis of the trailer by means of a pair of elongated bars, which are pivotally connected to the chassis.

A curved bar is connected to the other end of each elongated bar. When there is no boat on the boat trailer, the outrigger arms pivot outwardly and the curved bars pivot upwardly. When the bow of the boat is secured to the front of the trailer, the bottom of the boat forces the curved bars downward, as the trailer is pulled from the water. As the curved bars move downward, the outrigger arms are forced to pivot inwardly. As the outrigger arms move inwardly, the arms push the sides of the boat to align the boat on the trailer.

DESCRIPTION OF THE PREFERRED EMBODIMENT

Figure 1:
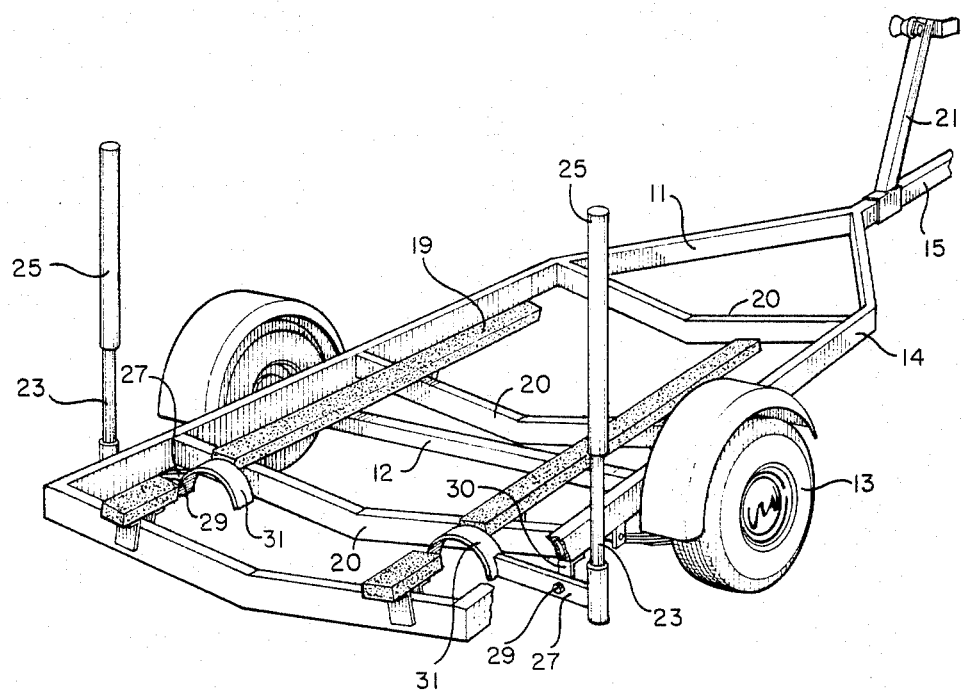
FIG. 1 is a perspective view of the boat trailer with the apparatus of the invention.

A typical boat trailer, illustrated in FIG. 1, has a metal chassis 11 supported by a pair of wheels 13 mounted on axle 12. The chassis 11 has two longitudinal frame members 14 terminating in a tongue 15, which may be hitched to a towing vehicle. A pair of flat runners 19 are mounted on cross members 20 of the chassis 11 perpendicular to axle 12 extending to the rearward end of chassis 11 to support the boat. A tie stand 21 is mounted on the tongue 15 for securing the bow of the boat onto the trailer.

Figure 2:
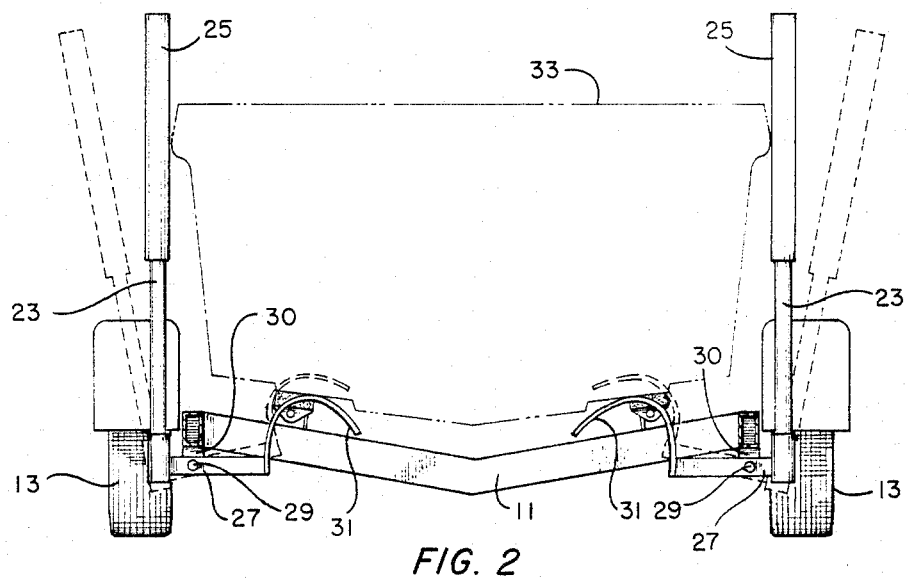
FIG. 2 is a partially sectioned rear end view of the boat trailer and apparatus of the invention, with a boat mounted on the trailer. The shadowed lines illustrate the open position of the outrigger arms.

The apparatus for centering the boat on the trailer is mounted on the chassis 11 near the rear end of the trailer, and is shown in both FIGS. 1 & 2. A pair of outrigger arms 23 extend upward on either side of the trailer. Each arm 23 has padding 25 to protect the sides of the boat. Each arm is connected to a lateral bar 27, which is pivotally connected to the chassis 11 with a bolt 29. Bolt 29 preferably extends through a bracket 30 mounted to the bottom of each frame member 14.

Bracket 30 is located rearward of axle 12, but about one foot forward of the rearward ends of frame members 14. Pin 29 and bracket 30 are located between the inner and outer ends of bar 27 and allow bar 27 to pivot about pin 29. About a six inch space is required in each runner 19 to provide clearance for bar 31. The short section of each runner 19 at the rearward end is supported by the rearward cross member 20, which is not shown in FIG. 2. Bar 27 is connected to arm 23 at a 90 degree angle. The outrigger arms 23 will be located on the outer sides of the frame member 14. The lateral bars 27 thus form pivot means for pivotally connecting the centering apparatus to the chassis 11 of the trailer.

A padded contact member 31 is connected to each lateral bar 27 at the end opposite the outrigger arm 23. In the preferred embodiment, this contact member 31 is a curved bar having one end connected to the bar 27 and the other end free. Curved bar 31 is upwardly curved, faces downwardly and is generally elliptical. These curved bars 31 are a contact means for contacting the bottom of the boat. As the lateral bar 27 pivots on the chassis 11, the curved bar 31 is movable between an upper position and a lower position. The six inch slot in each runner 19 allows the curved bar 31 to pivot above the top of each runner 19. The lateral bar 27 is a connection means for connecting the curved bar 31 to the bottom of the outrigger arm 23. A stop (not shown) limits the outward travel of arms 23 when the boat is not on the trailer.

In operation, to load a boat, the empty boat trailer is backed down a boat ramp until the rear end of the trailer is beneath the water. At this time, the outrigger arms 23 are in the outer position shown in the shadowed lines in FIG. 2. The weight of the arms 23 causes the arms to be in the outer position and the curved bars 31 to be in the upper position. Since the distance between the two outrigger arms 23 is considerably larger than the beam of the boat when in the outer position, the bow of the boat is easily guided between the two outrigger arms 23. The bow of the boat is then secured to the tie stand 21. While the trailer is still in the water and the bow of the boat is secured to tie stand 21, the bottom of the boat will not be contacting the curved contact members 31. The boat will be at least partially floating.

The boat possibly may not be properly aligned over the runners 19 once the trailer starts being pulled from the water. The stern section of the boat, however, will contact the curved bars 31, pushing them downwards, as the trailer is pulled up the ramp. This action causes the lateral bars 27 to pivot about the pins 29. As the lateral bars 27 pivot, the outrigger arms 23 are caused to move inwardly. If the boat is misaligned to one side of the trailer or the other, the outrigger arm 23 on that side will first contact the side of the boat. As the outrigger arms 23 are forced inwardly, the arms 23 will align the stern of the boat with the rear end of the chassis 11.

Once loaded the outrigger arms 23 will be in contact with the sides of the boat 33, indicated by the solid lines in FIG. 2. Curved bars 31 will be in contact with the bottom of the boat. The padding 25 will be compressed to some extent to provide an inward bias of each outrigger arm 23 against the boat 33.

The apparatus of the invention has significant advantages over the prior art. The large distance between the outrigger arms 23 enables the bow of the boat to be easily maneuvered between the arms 23. As the trailer is pulled from the water, the weight of the boat automatically causes the outrigger arms 23 to be forced together. Thus, the centering apparatus does not have to be manually operated. Instead, the centering apparatus is operated automatically as the trailer is pulled up the boat ramp.

While the invention is being shown in only one of its forms, it should be apparent to those skilled in the art that it is not so limited, but is susceptible to various changes and modifications without departing from the spirit thereof.

I claim:

1. An apparatus for centering a boat on a boat trailer having a chassis comprising:

an outrigger arm, pivotally carried on each side of the trailer and extending upward to contact the side of the boat, the outrigger arms being movable between an inner position and an outwardly inclined outer position;

contact means for slidingly contacting the bottom of the boat, said contact means being movable from a lower position in contact with the bottom of the boat to an upper position when the weight of the boat is not on the contact means; and connection means, connecting the outrigger arms to the contact means, for causing downward movement of the contact means due to the weight of the boat to pivot the outrigger arms inwardly to the inner position.

2. The apparatus as recited in claim 2 wherein the weight of the arms sustains the arms in the outer position until the contact means is moved downward.

3. The apparatus as recited in claim 2 wherein the contact means is a flat curved member secured to the connection means.

4. An apparatus for centering a boat on a boat trailer having a chassis, comprising:

a pair of outrigger arms pivotally carried on opposite sides of the trailer and extending upward to contact the sides of the boat, the outrigger arms being movable between an inner position and an outwardly inclined outer position;

a pair of lateral bars, each having an outer end secured to a lower end of one of the outrigger arms for movement therewith and an inner end extending inward; and contact means located on an inner end of each bar for contacting the bottom of the boat and for pivoting each bar downwardly and each outrigger arm inwardly to guide the boat onto the trailer;

the contact means being a curved member secured to the bar.

5. In a trailer having a chassis comprising a pair of longitudinal frame members interconnected by cross members, and at least two longitudinal runners mounted to the cross members for supporting a boat, an apparatus for centering the boat on the trailer while loading, comprising:

a pair of outrigger arms pivotally carried on opposite sides of the trailer, extending upward to contact the sides of the boat, the outrigger arms being movable between an upright inner position and an outwardly inclined outer position;

a pair of lateral bars, each having an outer end secured to a lower end of one of the outrigger arms, for movement therewith and an inner and extending inward; and a contact means located on an inner end of each bar for contacting the bottom of the boat and for pivoting the bar downwardly and each outrigger arm inwardly to guide the boat onto the trailer;

each bar, contact means and outrigger means being located forwardly of the rearward end of the runner and forwardly of the most rearward cross member, each runner having a slot formed therethrough to allow the contact means to extend above the runner when the boat is not on the trailer;

the contact means being a pair of curved members, each having an outer end connected to the inner end of one of the bars and a free inner end.

* * * * *